(12) United States Patent
Ouyang

(10) Patent No.: US 9,471,063 B2
(45) Date of Patent: Oct. 18, 2016

(54) ROBOTIC LAWN MOWER WITH NETWORK SENSORS

(76) Inventor: Chien Ouyang, Pleasanton, CA (US)

( * ) Notice: Subject to any disclaimer, the term of this patent is extended or adjusted under 35 U.S.C. 154(b) by 0 days.

(21) Appl. No.: 13/572,601

(22) Filed: Aug. 10, 2012

(65) Prior Publication Data
US 2013/0041526 A1 Feb. 14, 2013

Related U.S. Application Data

(60) Provisional application No. 61/574,866, filed on Aug. 11, 2011.

(51) Int. Cl.
*G05D 1/02* (2006.01)
*A01D 34/00* (2006.01)

(52) U.S. Cl.
CPC .......... *G05D 1/0265* (2013.01); *A01D 34/008* (2013.01); *G05D 1/028* (2013.01); *G05D 1/0255* (2013.01); *G05D 2201/0208* (2013.01)

(58) Field of Classification Search
CPC .............. A01D 75/00; A01D 75/006; A01D 2034/00; A01D 2034/835; A01D 34/008; G05D 1/0255; G05D 1/0265; G05D 1/028; G05D 2201/0208
USPC ........ 76/82.1; 172/13–22, 121, 552; 56/3, 5, 56/7, 10.2 A, 10.5; 701/23–26, 400, 701/408–412, 420–421, 2
See application file for complete search history.

(56) References Cited

U.S. PATENT DOCUMENTS

| | | | |
|---|---|---|---|
| 5,911,670 A * | 6/1999 | Angott ................. | A01D 34/008 56/10.2 A |
| 6,009,358 A * | 12/1999 | Angott ................. | A01D 34/008 180/168 |
| 7,010,425 B2 * | 3/2006 | Gray .................... | A01B 69/008 172/2 |
| 8,027,761 B1 * | 9/2011 | Nelson ................. | A01D 34/008 180/168 |
| 8,295,979 B2 * | 10/2012 | Thacher ............... | A01B 79/005 318/568.1 |
| 8,306,727 B2 * | 11/2012 | Morselli ................ | A01B 9/007 340/438 |
| 8,374,721 B2 * | 2/2013 | Halloran ................... | A47L 5/30 318/568.1 |
| 9,128,486 B2 * | 9/2015 | Chiappetta ........... | G05D 1/0272 |
| 2004/0056779 A1 * | 3/2004 | Rast ....................... | B63B 22/16 340/985 |
| 2004/0111196 A1 * | 6/2004 | Dean ..................... | A01D 34/008 701/23 |
| 2005/0243936 A1 * | 11/2005 | Agrawala ............. | H04W 64/00 375/259 |
| 2006/0161318 A1 * | 7/2006 | Aldred ................. | G05D 1/0227 701/23 |

(Continued)

*Primary Examiner* — Atul Trivedi
(74) *Attorney, Agent, or Firm* — Perkins Coie LLP; Viola T. Kung; Yiming Zhang

(57) ABSTRACT

The smart robotic lawn mowing system utilizes the ultrasonic and RF devices placed on the robotic lawn mower and boundary stands to define the mowing area, to track the position of the robotic lawn mower, and to control and monitor the mowing routes. The installed devices form a network sensor for the mowing system to determine the relative distances in between boundary stands and robotic lawn mower. The couplings of robotic lawn mower and boundary stands may further define the mowing sequences of areas, the size of areas, and the mowing routes inside each area. The control of the robotic lawn mower may be wireless and users are able to monitor and modify the settings with a computer, a cell phone, and a tablet through a wireless network, a WIFI, or an internet.

12 Claims, 10 Drawing Sheets

(56) References Cited

U.S. PATENT DOCUMENTS

| | | | | |
|---|---|---|---|---|
| 2006/0213167 A1* | 9/2006 | Koselka | A01D 46/30 | 56/10.2 A |
| 2006/0221769 A1* | 10/2006 | Van Loenen | G01S 11/14 | 367/99 |
| 2006/0293794 A1* | 12/2006 | Harwig | G05D 1/0261 | 700/253 |
| 2007/0244610 A1* | 10/2007 | Ozick | A47L 5/30 | 701/23 |
| 2008/0039974 A1* | 2/2008 | Sandin | G05D 1/028 | 700/258 |
| 2008/0058987 A1* | 3/2008 | Ozick | A47L 5/30 | 700/250 |
| 2008/0097645 A1* | 4/2008 | Abramson | A01D 34/008 | 700/258 |
| 2008/0109126 A1* | 5/2008 | Sandin | G05D 1/028 | 701/23 |
| 2008/0262669 A1* | 10/2008 | Smid | G05D 1/0212 | 701/23 |
| 2008/0262718 A1* | 10/2008 | Farwell | G05D 1/0246 | 701/445 |
| 2009/0228165 A1* | 9/2009 | Ozick | A47L 5/30 | 701/23 |
| 2010/0156660 A1* | 6/2010 | Lee | G01S 13/82 | 340/8.1 |
| 2010/0326030 A1* | 12/2010 | Bernini | A01D 34/008 | 56/10.2 A |
| 2011/0166705 A1* | 7/2011 | Anderson | A01D 34/008 | 700/253 |
| 2012/0283906 A1* | 11/2012 | Anderson | G05D 1/0219 | 701/25 |
| 2012/0290165 A1* | 11/2012 | Ouyang | G05D 1/0255 | 701/25 |
| 2013/0041526 A1* | 2/2013 | Ouyang | G05D 1/0265 | 701/2 |
| 2013/0192183 A1* | 8/2013 | Choi | A01D 34/008 | 56/10.2 A |
| 2013/0192184 A1* | 8/2013 | Choi | A01D 34/008 | 56/10.2 A |
| 2013/0192185 A1* | 8/2013 | Hwang | A01D 34/008 | 56/10.2 A |
| 2013/0199145 A1* | 8/2013 | Hwang | A01D 34/008 | 56/10.2 A |
| 2013/0204437 A1* | 8/2013 | Koselka | A01D 46/30 | 700/259 |
| 2013/0212994 A1* | 8/2013 | Hwang | A01D 34/008 | 56/10.2 A |
| 2014/0303814 A1* | 10/2014 | Burema | A01B 79/005 | 701/3 |
| 2015/0234385 A1* | 8/2015 | Sandin | G05D 1/0265 | 700/258 |
| 2015/0366129 A1* | 12/2015 | Borinato | A01B 69/008 | 701/25 |

\* cited by examiner

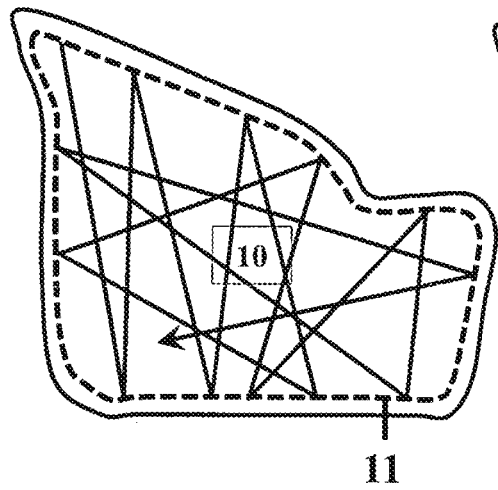
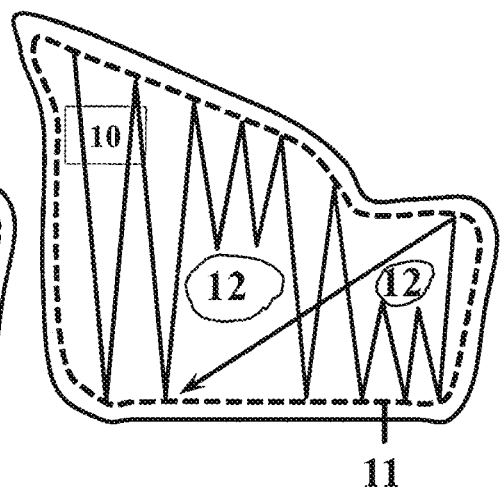
FIG. 4a  FIG. 4b
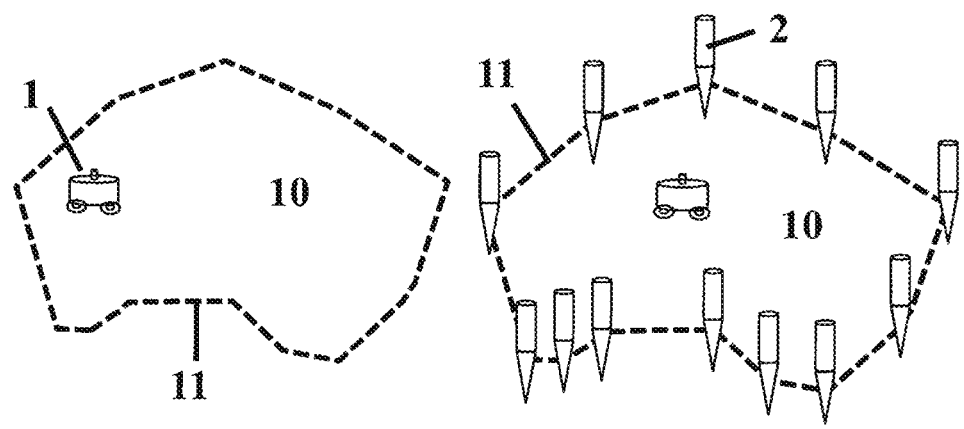
FIG. 5

Rest of stands are floating and removable

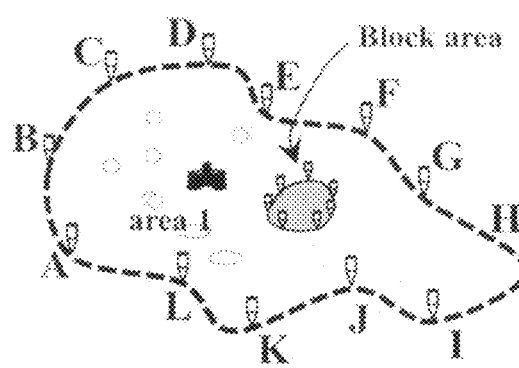
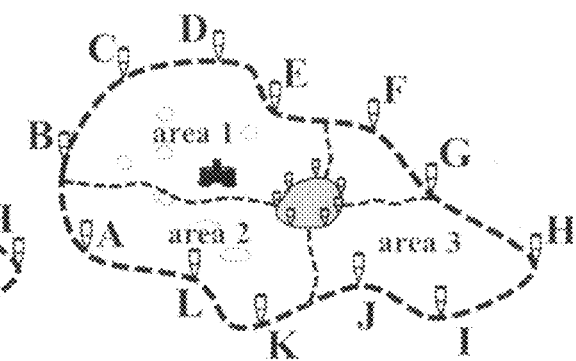
FIG. 14a  FIG. 14b
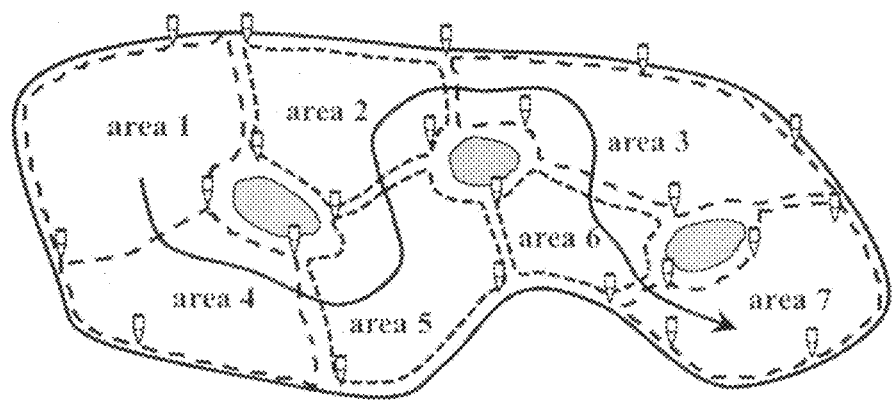
FIG. 14c
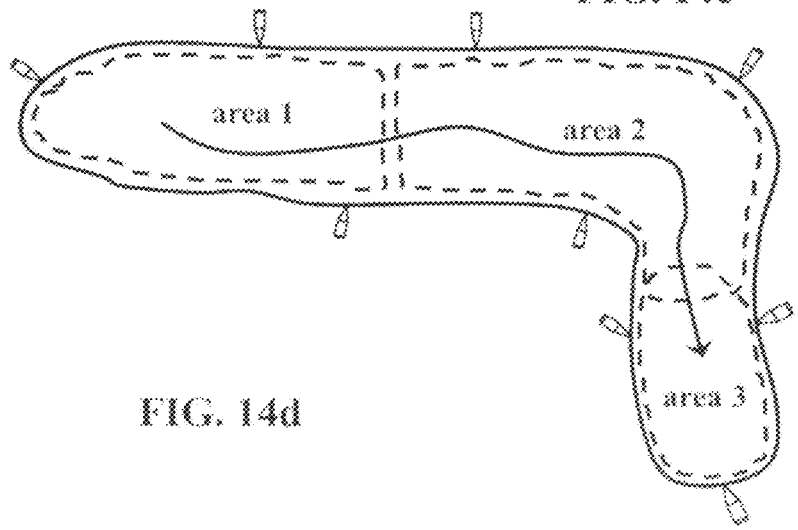
FIG. 14d

ROBOTIC LAWN MOWER WITH NETWORK SENSORS

BACKGROUND OF THE INVENTION

1. Field of the Invention

The present invention relates generally to a robotic lawn mower using network sensors to identify the mowing areas, to define the mowing routes, and to program the mowing routes and patterns. The invention utilizes ultrasonic and RF devices together to identify the mowing areas and to track the position of the robotic lawn mower. Based on the invention, users can define the mowing sequences of the mowing areas, identify the boundary of mowing areas, and program the mowing routes. The control of the robotic lawn mower may be wireless and users may monitor and control the robotic lawn mower with a computer, a cell phone, or a tablet through wireless network, a WIFI, or an internet.

2. Description of the Related Art

With the invention of robotic lawn mower, people now can use it to do the lawn work and therefore save the time and energy for other things. A robotic lawn mower is an autonomous robot used to cut lawn grass. A typical robotic lawn mower requires the users to set up a wire at the lawn border to enclose the grass area to be mowed. The robotic lawn mower may detect the electromagnetic signal from the wire when it is near the border so as not to travel outside the enclosing area. In some applications, the robotic lawn mower may follow the wire back to the docking station for battery recharging. Robotic lawn mower can be quite sophisticated equipped with sensors to detect if there is a rain and to detect grass and non-grass areas and some models can control the blade speed based on grass height and move in spiral pattern when longer grass is found.

However, the existing robotic lawn mowers in the market, although with a microcontroller or a CPU embedded on them, are still not smart enough to allow users to use it at different lawns, to vary the mowing areas, to identify mower's position with respect to lawn border, and to control and monitor the mowing route precisely no matter whether the mower is near the border or in the middle of the lawn. For example, users may want to mow his or her house's lawn yard today, but tomorrow would like to help mow neighbor's lawn. The setup wire at neighbor's yard, if not impossible, would be very impractical. If user is a gardener, the person will definitely need to mow different lawns which have different landscapes and are at different locations, and the setup of the wires will become extremely difficult and time consuming Another situation is that users may want to mow a specific area of the lawn today and to mow another specific area of the lawn tomorrow, and users may like to mow several areas of lawn following a predetermined route or path. For these regards, a smart robotic lawn mowing system which is able to identify the lawn areas, to vary the mowing areas flexibly, and to track the position of the mower during its operation at any time is needed. Another application is that users may want to monitor and to modify the settings of mowing through a network or an internet. The invention here is to address these kinds of needs.

From the point of energy saving, a robotic lawn mower which is able to mow the lawn yard smartly is important. A smart mowing scheme is able to cover the entire lawn area but not to keep mowing the same spots repeatedly. The available existing robotic lawn mower in the market are not equipped with network sensors, and therefore, they may either keep mowing some spots repeatedly or are not able to cover all the lawn areas without missing spots, and this is currently a common disadvantage of the available robotic lawn mower products in the industry. The present invention, smart robotic lawn mower with network sensors, is able to control the mowing route, to avoid the repetition of the mowing at the same spots, and to identify the position of robotic lawn mower inside the mowing areas. With network sensors, the robotic lawn mower is able to cover the spots that might be missed when using the traditional robotic lawn mower.

In this application, a smart robotic lawn mowing system allows users to freely use it at different lawns and at different areas of a lawn, is disclosed. The core of the invention is to place the network sensors, which are the ultrasonic and RF devices, in the lawn yard, and on the robotic lawn mower. The ultrasonic and RF devices in this application are referred as the network sensors because they are coupled together for the mowing work. The application is to place ultrasonic transmitter and RF device on the robotic lawn mower, and to place ultrasonic receiver and RF device on the boundary stands. The boundary stands here refer to the devices allowing the ultrasonic and RF devices to be placed on them, and they may be populated at the peripheral, inside, or outside of a lawn area. The devices on the mower will communicate with the devices on the boundary stands. For practical applications, the boundary stands may be a fence, a post, a solar light, a wood stick, or any other similar entities allowing the ultrasonic and RF devices to be mounted on. The popular solar lamps, populating in the yards near the houses, are a good example for the placement of the network sensors. Ideally, the boundary stands shall be flexible to be set up, and they shall be able to be put on or removed easily, and portable to be moved to any different lawns or to different areas in the lawn yard. The ultrasonic transmitter on the robotic lawn mower is to transmit an ultrasonic wave toward the boundary stands located at various positions, and the RF device on the robotic lawn mower is to receive the RF signals from the boundary stands, and to transmit RF signals toward boundary stands. The ultrasonic receivers on the boundary stands are to receive the ultrasonic waves from the robotic lawn mower, and after the receiving the ultrasonic wave from the mower, each boundary stand will transmit a RF signal back to the robotic lawn mower to notify the mower the relative distance in between boundary stand and robotic lawn mower. For this situation, the RF device on the boundary stand may function as transmitter.

With the network sensors, the robotic lawn mower system will firstly define the mowing area based on an algorithm. After that, the robotic lawn mower may start to mow a lawn, and the mowing system will track the position of the robotic lawn mower at any time during its mowing operation. A mowing route is then either automatically programmed or predetermined and the robotic lawn mower may mow a lawn yard with designated schemes. With this invention, the mowing route and pattern may be controlled, monitored, and modified by users at either local or remote sites.

SUMMARY OF THE INVENTION

The embodiment of the present invention provides a robotic lawn mowing system coupled with network sensors to control and to monitor the motion of the robotic lawn mower.

In one embodiment, the robotic lawn mowing system contains a robotic lawn mower and boundary stands.

In one embodiment, the robotic lawn mower contains an ultrasonic transmitter and a RF device.

In one embodiment, the boundary stand contains an ultrasonic receiver and a RF device.

In one embodiment, the boundary stands may be placed on the ground near the borders of the mowing areas, and at various locations to monitor the position of robotic lawn mower.

In one embodiment, the lighting devices and Bluetooth devices may couple with the robotic lawn mower and with boundary stands. For this case, the lighting devices and Bluetooth devices will replace RF devices to do the timing calculation and the transferring of distances data.

In one embodiment, the boundary stands may be set up inside the mowing areas, at the border of the lawn areas, and at the outside of mowing areas.

In one embodiment, the ultrasonic transmitter on the robotic lawn mower is to transmit ultrasonic wave toward boundary stands, ultrasonic receivers on the boundary stands are to receive the ultrasonic waves from robotic lawn mower, RF devices on the boundary stands and robotic lawn mower are to either transmit or receive the data of traveling distances, and to calibrate and synchronize the clock times.

In one embodiment, the boundary stands are used to define the mowing areas and to track the position of the robotic lawn mower at any time during its operation.

In one embodiment, the robotic lawn mower may be programmed to obtain the relative distances in between robotic lawn mower and boundary stands at a first location, after that, it moves a predetermined length in a predetermined direction to the second location to again obtain the relative distances in between robotic lawn mower and boundary stands. The robotic lawn mower may use the data of the relative distances, including those at the times before and after the predetermined moving of a length, and the predetermined moving length, to identify the relative positions of the boundary stands and robotic lawn mower.

In one embodiment, the robotic lawn mower may be programmed to mow a lawn without the repetition of the routes and to cover the lawn area completely without missing spots.

In one embodiment, some boundary stands may be fixed, floating, removable, and reusable.

In one embodiment, the network sensors may be using electromagnetic, sound, and light sources.

In one embodiment, the relative distances of the boundary stands and robotic lawn mower may be determined by the time-of-flight of ultrasonic waves.

In one embodiment, the boundary stands are used to determine the boundary of the lawn.

In one embodiment, the boundary stands may be coupled into several groups, and each group of boundary stands may be used to control the route of the robotic lawn mower within a mowing area.

In one embodiment, the lawn yard may be split into several mowing areas virtually with a program.

In one embodiment, the robotic lawn mower may mow the lawn yard by an area-by-area scheme, and each area may have different mowing patterns and routes.

In one embodiment, the groups of devices may be at sleep mode to save electricity or battery power.

In one embodiment, the network sensors on the boundary stands may be powered by solar cells, and may couple with solar lamps.

In one embodiment, the motion of the robotic lawn mower may be monitored and controlled by a local or remote computer, a cell phone, or a tablet.

In one embodiment, a CPU or a microcontroller may be on the robotic lawn mower to do the calculation and simulation. The calculation is to determine the mowing area, to track the position of the robotic lawn mower at any time during its operation, and to determine the mowing route, pattern, speed, frequency, and period.

In one embodiment, the robotic lawn mower may have a memory device on it for the storage means, and a map of mowing areas may be stored in the memory device.

In one embodiment, the network sensors on the boundary stands are to guide the motion of the robotic lawn mower.

In one embodiment, a boundary stand may be repeatedly used to define the border of the mowing area.

BRIEF DESCRIPTION OF THE DRAWINGS

A better understanding of the present invention may be obtained when the following detailed description is considered in conjunction with the following drawings, in which:

FIG. 4 illustrates an uncontrolled mowing route of a robotic lawn mower inside a lawn.

FIG. 5 illustrates a robotic lawn mower inside a mowing area and several boundary stands are placed on the ground near the border of the mowing area.

FIG. 14a illustrates that the boundary stands may be located inside a lawn area and along the outer boundary of a block area.

FIG. 14b illustrates that the boundary stands may be located inside a lawn area and along the boundary of a block area, and the lawn area may be split into several smaller areas virtually with a mowing program.

FIG. 14c illustrates that the robotic lawn mower may do the mowing with an area-by-area scheme.

FIG. 14d illustrates that the robotic lawn mower may do the mowing with an area-by-area scheme.

Figure 1:
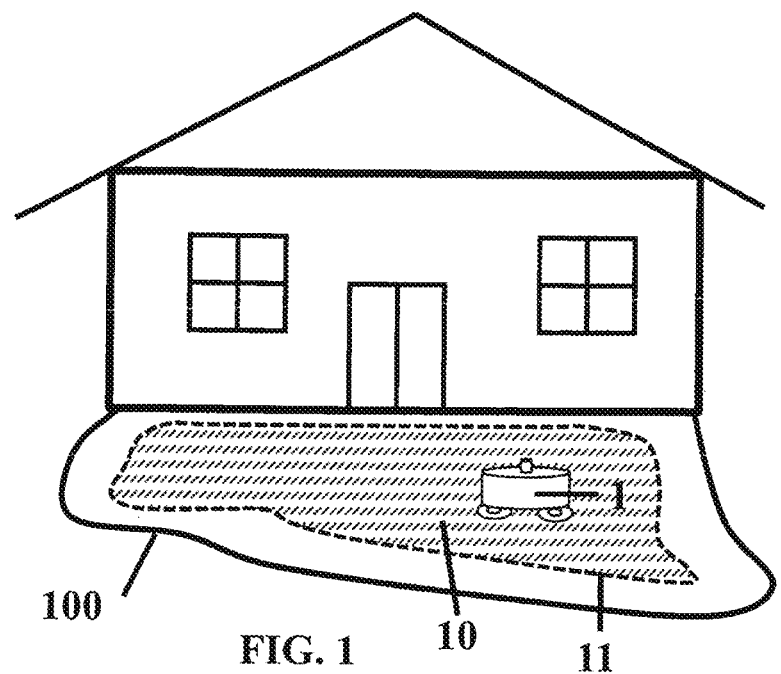
FIG. 1 illustrates a robotic lawn mower inside a lawn.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE INVENTION

The invention generally relates to a robotic lawn mower 1 coupled with network sensors to allow users to freely use it for different lawns and at different areas in a lawn. The mowing routes and patterns may be controlled and monitored with the network sensors. The network sensors here referred to the ultrasonic and RF devices for the purposes of distance measurements and data communications. The system will firstly determine the mowing area, such as the size and the position of the border enclosing the lawn. Secondly, after the determination of the border of the lawn, the robotic lawn mower 1 will be ready to mow and a tracking method is used to track the position of the robotic lawn mower 1 inside the mowing areas at any time during its operation. Thirdly, after knowing the lawn size and the border of lawn, and the mower's position is tracked at any time during its operation, either a microcontroller or a CPU on the mower will determine the mowing routes and patterns. The mowing routes and patterns may be predetermined and programmed by users. With this disclosure, the robotic lawn mower 1 may avoid the repetition of mowing the same places and at the same time to cover all the areas without missing spots. Furthermore, a lawn may be split into several areas virtually with a program, and the robotic lawn mower 1 may mow the lawn with an area-by-area scheme, and the mowing may be monitored and controlled by a computer or a cell phone through a local or remote network. With the disclosure here, users may utilize the system for their own lawns, their neighbor's lawn, or any other different lawns at different places. Furthermore, the system allows the users to vary their mowing areas and mowing routs depending on their needs and preferences.

The advantages of the robotic lawn mower 1 are explained in detail in the text and with figures below. FIG. 1 illustrates a typical application of a robotic lawn mower 1. The robotic lawn mower 1 is to mow an area 10 enclosed by its outer boundary 11 at a land 100. An important operation of the mower is not to travel outside of its outer boundary 11. For this regard, the existing robotic lawn mower 1, in the market right now, will set up a wire beneath the ground and along the outer border of lawn, to constrain the motion of the mower from traveling to outside. When the robotic lawn mower 1 gets near the wire, it will sense the electromagnetic wave from the wire and therefore change its mowing directions. The drawback of the wire is that a pre-installation of the wire will be required and it will be extremely difficult to use the robotic lawn mower 1 for neighbor's lawn. Furthermore, users may like to vary their mowing areas depending on grass conditions or whatever any other personal preferences. The available lawn mowers in the market do not provide this kind of flexibility and therefore the current application is to address these needs.

Figure 2:
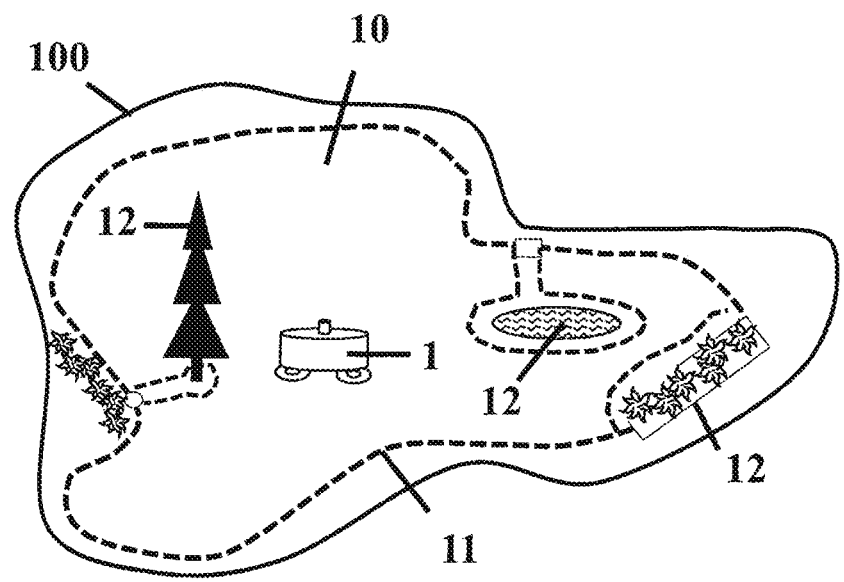
FIG. 2 illustrates a robotic lawn mower is located inside a lawn and the lawn may have several block areas.

FIG. 2 illustrates one example of the robotic lawn mower 1 to mow an area with several objects inside. The objects could be a bush of flowers, a swimming pool, a tree, and other things. The robotic lawn mower 1 is not allowed to go across these objects. In this application, the locations where these objects located are defined as block areas 12 here. The dashed line in the figure illustrates a possible way of setting up the wire so the robotic lawn mower 1 will not go across the border and get into the block area 12. In one embodiment, the wire is difficult to install for such a complex geometry, and people may prefer not to dig the lawn to install the wires. In another embodiment, people may not want to mow the entire area in one shot, and may want to split the area virtually into several smaller areas, and do the mowing of each small area at the times of their conveniences. Therefore, a smart robotic system will be needed for this kind of situation.

Figure 3A:
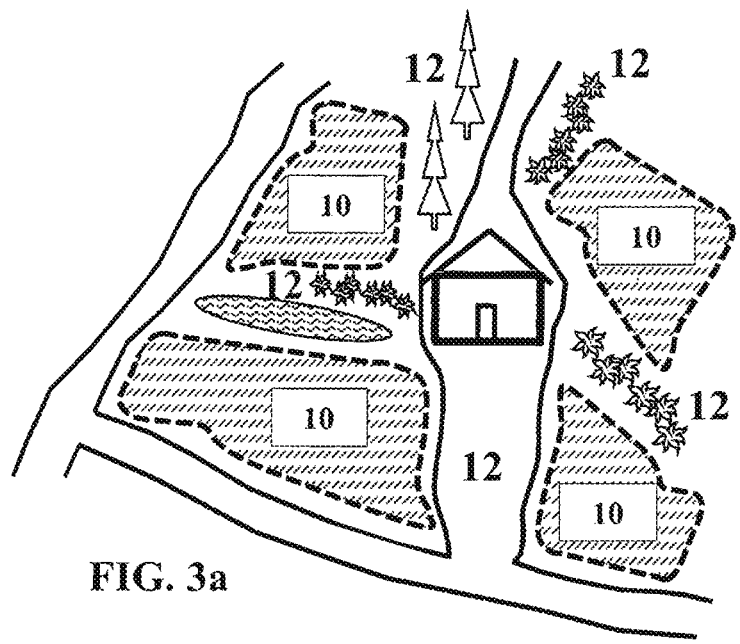
FIG. 3a illustrates several lawns separated by the block areas.

FIG. 3a illustrates a possible situation that the lawn areas 10 to be mowed could be separated from each other and are not connected together. The areas may be separated from each other by a bush of flower, a concrete road, a swimming pool, or some trees. For the situation, it will be very difficult to set up the wires on each area's border, and a smart robotic lawn mower 1 will be preferred. Another situation is that people may want to mow different lawns at different places, and the lawn may have various geometries. Therefore, it will be not practical to use the wires for such situation. The installation of the electric wires for a gardener who wishes to use robotic lawn mower 1 for his many customers will be a very tedious work.

Figure 3B:
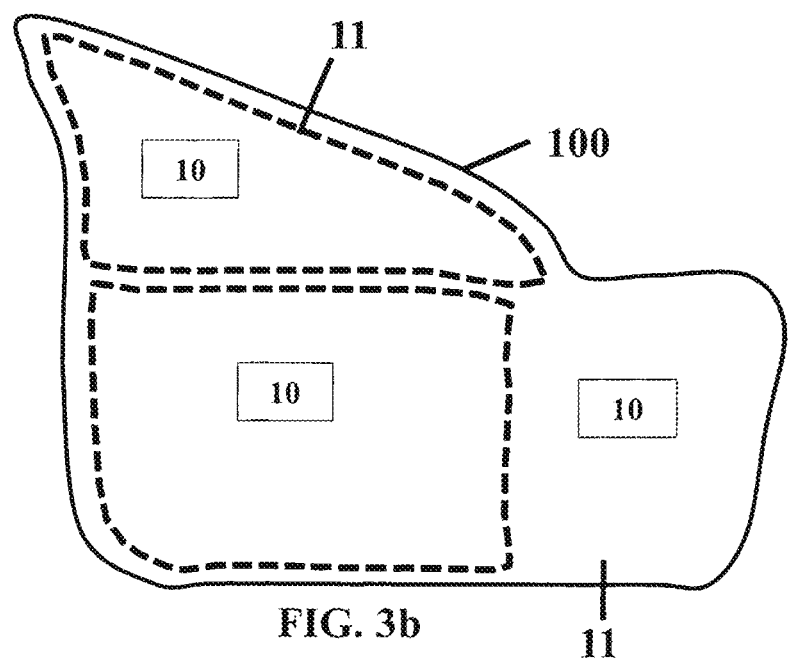
FIG. 3b illustrates a lawn is virtually split into several areas.

FIG. 3b illustrates, in one situation, users may want to mow different areas of a lawn at different times even the areas are connected together, and may prefer to mow some areas more frequent than other areas. The dash lines in the figure may represent the virtual boundaries of the areas. In one embodiment, the areas may be overlapped, connected, or disconnected.

In summary for the stated situations above, a smart robotic lawn mower 1 may be needed. The smart robotic lawn mower 1 system allows the users to freely define their mowing areas, and user may carry the system to anywhere without the need to set up the electrical wires. The application may be very useful for a gardener who has many customers and like to mow different lawns smartly at different locations.

FIG. 4a and FIG. 4b illustrate typical mowing routes for a robotic lawn mower 1 without network sensors. The mowing routes are generally random patterns or with a simple assigned direction such as zigzag. For the situations, the mower may repeat the mowing at same spots and may not be able to cover the entire lawn area without missing spots. The repetition of the mowing spots, as shown in FIG. 4a, is a wasting of the electricity and it may take much longer time to finish the yard work, and this is an issue for the available robotic lawn mower 1 in the market right now. For a lawn which has several block areas 12 inside, such as the one shown in FIG. 4b, the situation becomes more complicated and it may be difficult for traditional robotic lawn mowers 1 to cover entire lawn area without missing spots, because mower does not have visions to look at the lawn situation. This disclosure, with network sensors, provides a solution for robotic lawn mower 1 to detect outer boundary of the lawn and internal block area 12. With this disclosure, the mowing route may be controlled to be efficient without the repetition to cover entire lawn area without missing spots.

FIG. 5 illustrates the concept of the smart robotic lawn mower 1 with network sensors. The system contains at least one or more robotic lawn mower 1. The robotic lawn mower 1 is to do the yard work inside an area of lawn 10, and the dashed line in the figure represents the boundary of lawn. The area's geometry and size could be different. To define the mowing area, some devices are used. In this disclosure, the devices are to be placed on the boundary stands 2, and these boundary stands 2 are to be placed along the outer border or the peripheral of lawn, as shown in the figures. Before the usage of the smart robotic lawn mower 1 system, the boundary stands 2 may be placed on the ground along the border of lawn. In one embodiment, the more number of boundary stands 2 may be better to capture the geometry of mowing area. However, if the geometry is quite simple, then there is no need to put lots of boundary stands. For a square lawn area, four boundary stands 2 may be enough to depict the mowing area. For a lawn area having curves or irregular shapes at the border, more boundary stands may be needed for the robotic lawn mower base 1 to precisely identify the mowing area.

Figure 6A:
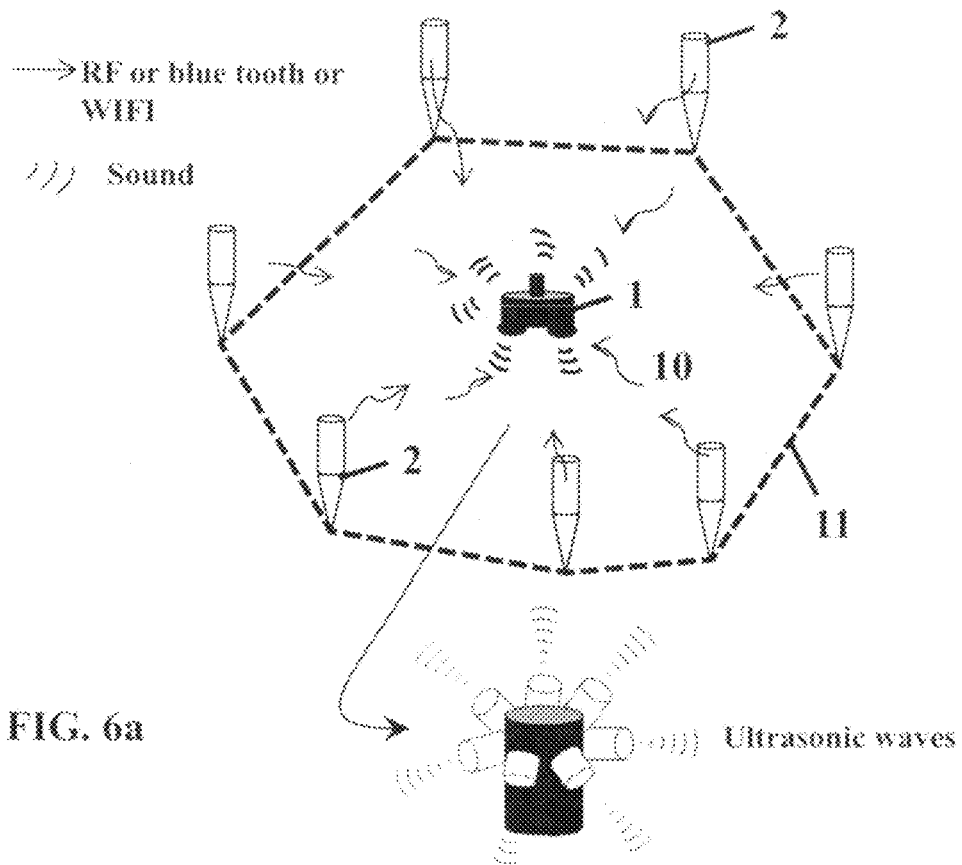
FIG. 6a illustrates a robotic lawn mower is to transmit ultrasonic signals toward the boundary stands, and the boundary stands are to transmit the RF signals toward the robotic lawn mower.
Figure 6B:
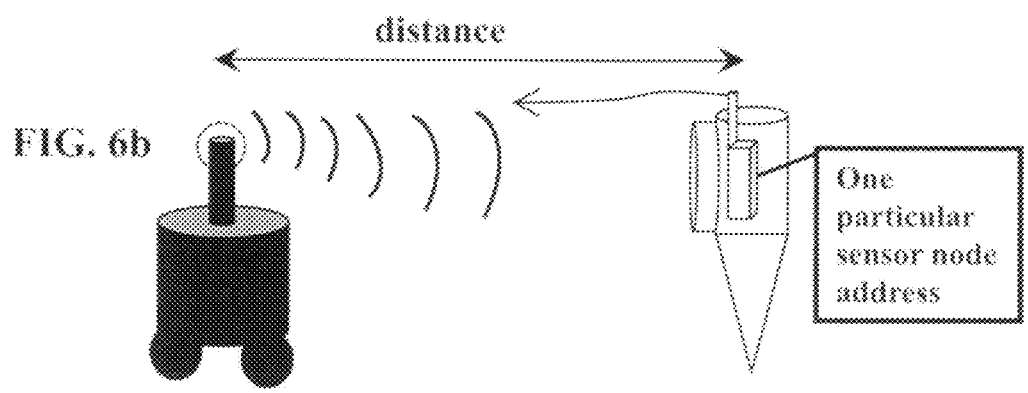
FIG. 6b illustrates the distance calculation using ultrasonic and RF devices.

FIG. 6a illustrates that the robotic lawn mower 1 is transmitting ultrasonic waves toward the boundary stands 2, and the boundary stands 2, upon the receiving of ultrasonic waves, will transmit RF signals back to robotic lawn mower 1 to inform the robotic lawn mower 1 the relative distances. For this situation, the RF devices on the boundary stands are functioning as transmitters. The robotic lawn mower 1 system may be designed to transmit the ultrasonic waves covering 360 degrees and in a specified tilted angles to maximize the transmission efficiency, and the mower may comprises several ultrasonic transmitters for different directions and angles. For this situation, the robotic lawn mower functions as an ultrasonic broadcaster to transmit ultrasonic waves in circular directions. Ideally all the ultrasonic transmitters shall transmit the sound waves at the same time, but since the sound is traveling at a very high speed, therefore a small time delay to transmit the sound waves among transmitters, is still workable as long as the timing is carefully calibrated. The purpose of the design is to determine the relative positions and distances in between the robotic lawn mower 1 and boundary stands 2. FIG. 6b illustrates the mechanism to determine the relative distances. The robotic lawn mower 1 is equipped with an ultrasonic transmitter and a RF device. As the robotic lawn mower 1 transmits an ultrasonic sound wave out, the sound wave takes time to reach the boundary stand 2, and the relative distance, as shown in the figure, can be calculated based on the time-of-flight because the sound speed is basically a known value although the value has to be calibrated based on environmental temperature and humidity. The boundary stand 2 is equipped with an ultrasonic wave receiver and a RF device. Upon the receiving of the ultrasonic wave, the boundary stand 2 may transmit a RF signal back to notify the robotic lawn mower base 1. In theory, the RF signal takes time to travel back to robotic lawn mower 1, but since the RF signal travels near light speed, thus the time-of-flight of RF signal is very short it may be ignored for mowing applications. In practical applications, the operation of the electronic circuits on both the robotic lawn mower 1 and on the boundary stands 2 may have electronic latency time delay, and all of these delays shall be considered in order to obtain accurate time-of-flight to calculate the relative distances.

In one embodiment, the RF signals may be used to calibrate and to synchronize the clock times of the robotic lawn mower 1 and boundary stands 2. One example is that, right before or right after the robotic lawn mower 1 transmits an ultrasonic wave toward the boundary stands 2, the mower may transmit a RF signal toward all boundary stands 2, and in theory, all the boundary stands 2 shall receive this RF signal at almost the same time and the boundary stands 2 may define this particular time as a reference. The speed of RF signal is much faster than ultrasonic wave, and therefore the RF signal is always ahead of ultrasonic signal. Each boundary stand 2, after the receiving of the coming ultrasonic wave from robotic lawn mower 1, it may calculate the time difference in receiving ultrasonic wave and RF signal. The time difference is basically a linear function of the distance, thus the relative distances in between robotic lawn mower 1 and boundary stands 2 can be calculated. In one embodiment, each boundary stand 2 may have a particular address or an ID so the robotic lawn mower base 1 knows where is the RF signal coming from. The address or ID of the boundary stands 2 may be achieved by either hardware or software methods. With the approach, the relative distance in between robotic lawn mower and each boundary stand 2 is obtained. In one embodiment, the RF signal may be replaced with for example a lighting signal. One example is to use infrared light signal, and each infrared signal may have particular wave length, frequency, or ID so the robotic lawn mower 1 may identify the signal source is coming from which boundary stand 2.

Figure 7A:
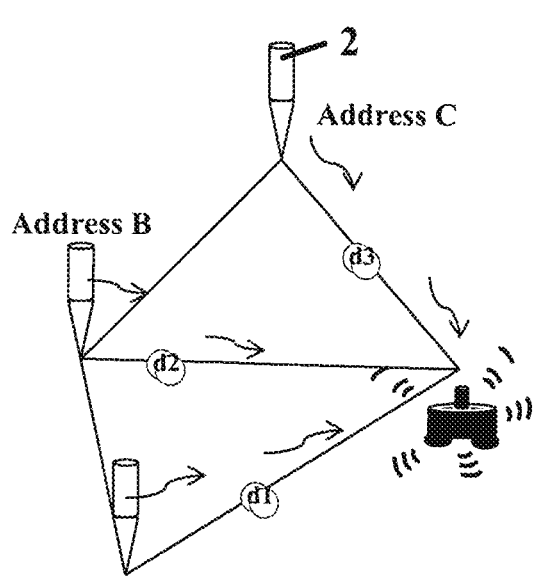
FIG. 7 illustrates the distance calculation using ultrasonic and RF devices.
Figure 7B:
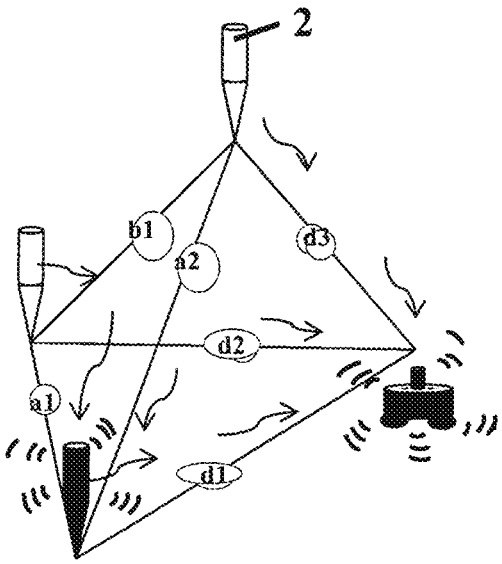

FIG. 7a illustrates that the relative distances, such as, d1, d2, and d3, between boundary stands 2 and robotic lawn mower 1 can be calculated based on the time-of-flight of ultrasonic waves, but the angles of the directions are not known and therefore the exact boundary of lawn may not be determined completely. One solution is to have one of the boundary stands 2 to transmit ultrasonic waves toward other boundary stands 2, and to receive RF signals from other boundary stands 2, and FIG. 7b illustrates the approach is able to determine all relative distances and relative positions. In one embodiment, more than one of boundary stands 2 may have the ultrasonic transmitters in order to better define the lawn boundary. In another embodiment, the boundary stands 2 may be extruded out of ground to form a 3D configuration, and the relative distances will be calculated based on 3D trigonometry.

Figure 8:
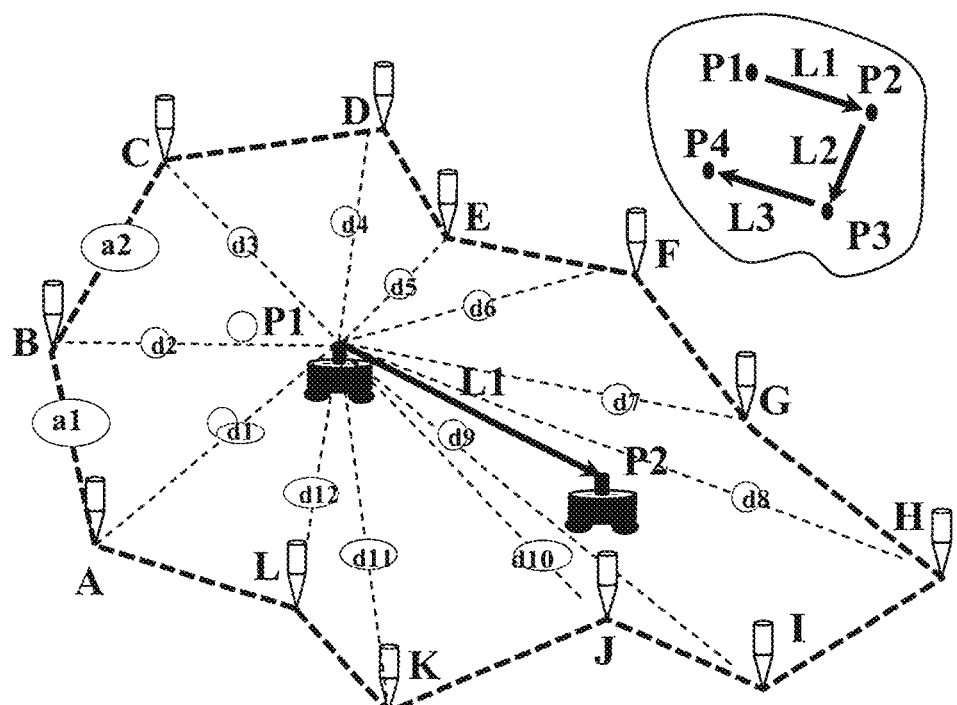
FIG. 8 illustrates the calculation of the relative distances in between boundary stands and robotic lawn mower, and to define the boundary of mowing area.

In one embodiment, the ultrasonic transmitters on boundary stands 2 as shown in FIG. 7b may be not needed, and FIG. 8 illustrates a means to identify the yard boundary without the need of ultrasonic transmitters being on boundary stands 2. Initially the robotic lawn mower 1 may be located at position P1, and the relative distances in between boundary stands 2 and robotic lawn mower base 1 are calculated based on the time-of-flight of ultrasonic waves which is from robotic lawn mower to each boundary stand. The next step is that the robotic lawn mower 1 is programmed to travel a length L1 to the position P2, and again the relative distances in between the boundary stands 2 and robotic lawn mower 1 are calculated. The data of relative distances from before and after the traveling of a length, and the length L1, may be used to calculate exact relative positions of the boundary stands 2 and robotic lawn mower 1 with mathematical trigonometry. In one embodiment, the robotic lawn mower 1 may be programmed to travel to several positions, such as P1, P2, P3, P4 . . . to calculate the changes of the relative distances in between the boundary stands 2 and robotic lawn mower 1. The multiple moving steps may be used to eliminate the uncertainties and numerical errors, and to confirm the geometry of the lawn. The moving lengths L1, L2, L3, as shown in the figure, and the moving directions may be flexibly chosen. In one embodiment, the approach used here is able to save electricity or battery power because the transmitting of ultrasonic signals from boundary stands 2 to robotic lawn mower may consume more electricity or battery power, especially when the system has many boundary stands 2.

Figure 9:
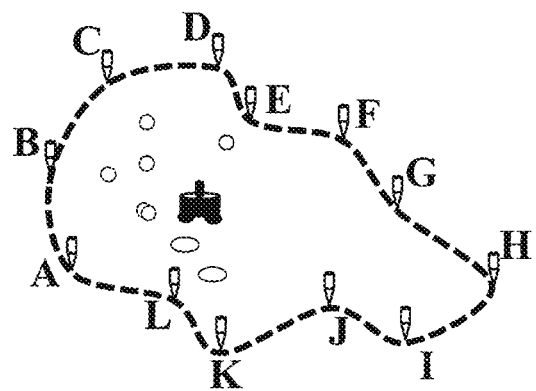
FIG. 9 illustrates boundary stands are located at the lawn peripheral to define the boundary of the lawn.
Figure 10:
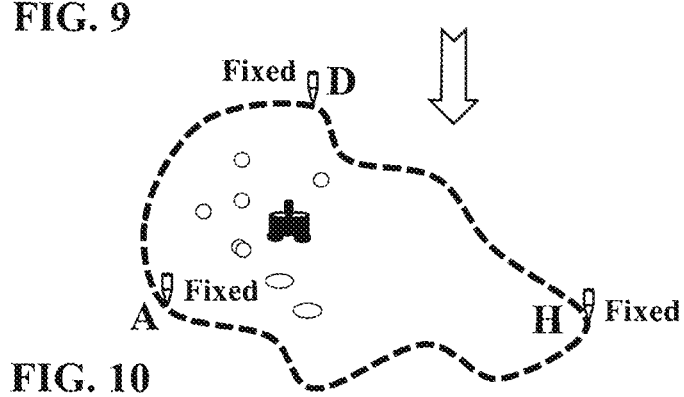
FIG. 10 illustrates boundary stands are located at the lawn peripheral to define the boundary of the lawn.

If the geometry of the lawn is complicated, more boundary stands 2 may be needed to define the boundary of the lawn and FIG. 9 illustrate one example. However, using lots of boundary stands 2 may increase the cost and the power consumption. In one embodiment, after the definition of the lawn boundary, most of the boundary stands 2 may be removed as shown in FIG. 10, and only a few fixed boundary stands 2 are used. In FIG. 10, the moving of robotic lawn mower 1 is tracked by three boundary stands 2. The relative distances in between three boundary stands 2 and robotic lawn mower 1 is to track the position of the robotic lawn mower 1 at any time during its operation. In a further embodiment, two or more than two boundary stands 2 may be used to track the positions of the robotic lawn mower 1 during its operation inside a lawn. With this approach, the robotic lawn mower may always know its position with respect to boundary stands, during its moving inside the lawn yard, thus the mowing patterns and routes can be designated and monitored.

Figure 11:
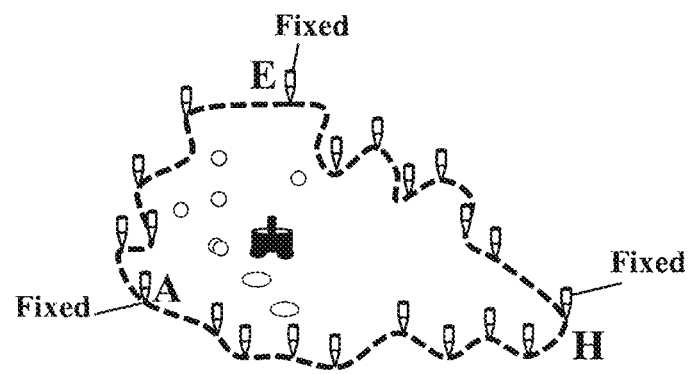
FIG. 11 illustrates floating boundary stands are used to define the boundary of the lawn.

For a lawn yard with complicated geometry such as several curves at its boundary, as shown in FIG. 11, more network sensors and therefore more boundary stands 2, may be needed. The increasing number of boundary stands 2 may be more difficult to maintain, and the cost may be increased. In one embodiment, some boundary stands may be fixed, such as the A, E, and H, as shown in the figure. These boundary stands 2 may function as the referenced positions. Either the robotic lawn mower 1 or other boundary stands may use these referenced positions to identify their own positions. In another embodiment, some boundary stands may be floating which means that they may be used more than once and they may be removed. With the known positions of referenced boundary stands 2, the floating boundary stands 2 may be used to identify a portion of the lawn boundary, and after the positions are determined and recorded, these boundary stands 2 may be removed and reused for other portions of the lawn boundary. The floating and the reusable boundary stands 2 may be useful when the geometry of lawn is complicated.

Figures 12A, 12B:
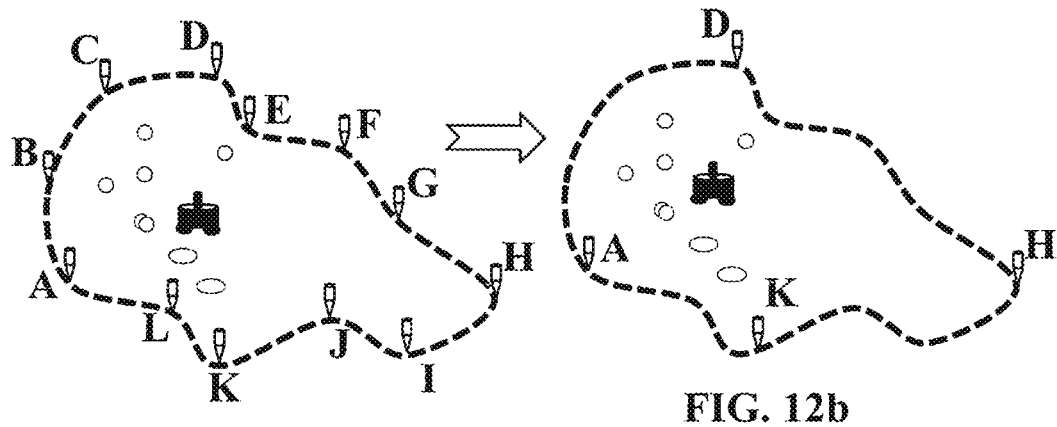
FIG. 12 illustrates boundary stands are located at the lawn peripheral to define the boundary of the lawn.
Figure 12C:
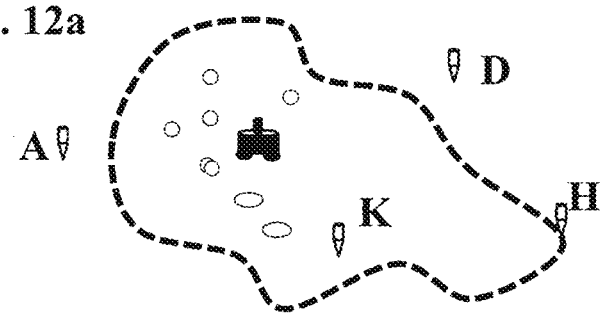

FIG. 12a illustrates the boundary stands 2 are located at the lawn boundary, and FIG. 12b illustrates four boundary stands 2 are used to track the position of the robotic lawn mower 1. In one embodiment, the boundary stands 2 used to track the position of the robotic lawn mower 1 may be placed at arbitrary positions, either inside or outside the lawn, and either exactly on the boundary or not on the boundary of the lawn, as shown in FIG. 12C. In real applications of ultrasonic devices, the quality of transmission and receiving have to be considered, and the flexible positions of boundary stands 2 may improve the communications among devices.

Figure 13:
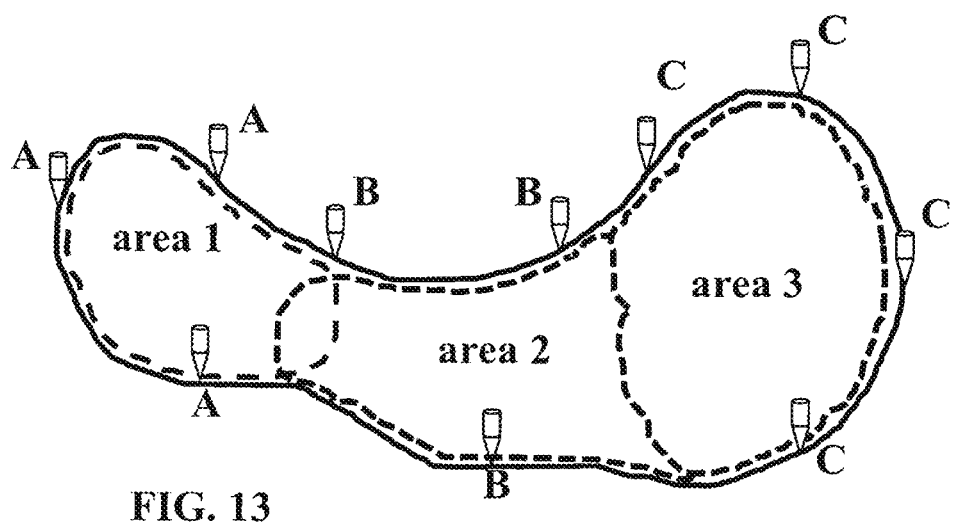
FIG. 13 illustrates a lawn may be split into several mowing areas virtually with a program.

In one embodiment, a lawn may be split virtually into several mowing areas as shown in FIG. 13. When a lawn is big or the lawn shape is irregular, the split of one single mowing area into several smaller mowing areas may be useful for users to control and to monitor robotic lawn mower 1. In one embodiment, the areas may be overlapped, connected, or disconnected, and each mowing area may use certain boundary stands 2 to track the position of the robotic lawn mower 1. The application may be useful when users like to mow different areas of a lawn at different times or dates. In one embodiment, the boundary stands 2 may be used for more than two areas, for example, a boundary stand 2 which is sitting near two neighboring areas may be used for both areas. In a further embodiment, a boundary stand may be used for several mowing areas.

FIG. 14a illustrates that the boundary stands 2 may be at the boundary of a lawn and be at the boundary of a block area 12. The RF device on the boundary stands 2 may have different ID for lawn and block areas so the robotic lawn mower may identify the RF signals are from a lawn boundary or from a block area. FIG. 14b illustrates that a complicated geometry of the lawn with a block area inside. The lawn may be split into several mowing areas virtually with a software program. Similarly, FIG. 14c illustrates a lawn which has many block areas 12 inside. The robotic lawn mower 1 may be programmed to do the yard work area by area following a predetermined sequence. FIG. 14d illustrates that when the lawn is big, long, and with irregular geometry, users may program the mowing sequence with an area-by-area scheme, for example, area 1 to area 2 then area 3, as shown in the figure. As mentioned in previous sections, the robotic lawn mower 1 is broadcasting the ultrasonic sound waves in circular directions toward boundary stands 2, thus as it enters into a specific area, the relative positions in between itself and nearby boundary stands will be automatically calculated based on the means introduced in FIG. 8.

Figure 15:
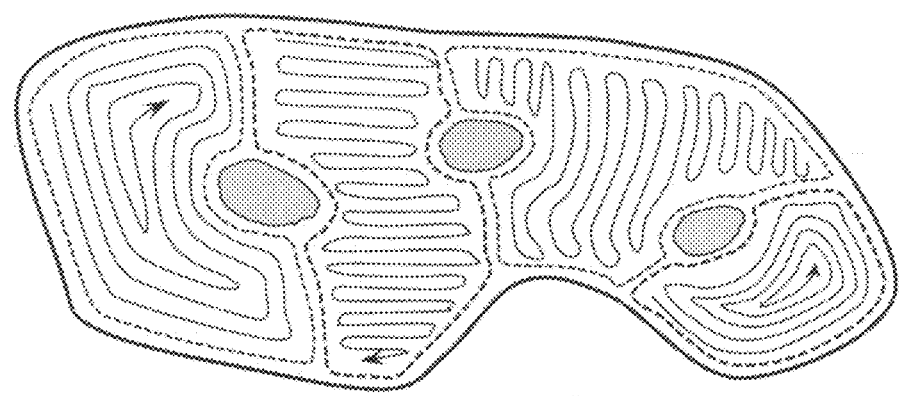
FIG. 15 illustrates that the mowing areas may have different mowing patterns, and each area may have different mowing settings.

The core of the invention is that the boundary stands 2 are used to define the boundary of the mowing areas, and the position of robotic lawn mower 1 is tracked when it is traveling inside the areas at any time during its operation. After the identification of the mowing boundary, a mowing pattern is constructed for the robotic lawn mower 1 to do the yard work. In one embodiment, the mowing pattern may be constructed based on a numerical scheme, and FIG. 15 illustrates one example of a lawn is split into several mowing areas virtually, and different mowing patterns may be applied in the areas. The mowing patterns may be defined with practical considerations, such as, an area where the grass grows very fast then the robotic lawn mower 1 may be programmed to mow the area repeatedly and the routes may be repeated, an area where the grass grows very slow then the robotic lawn mower 1 may mow it once every a few days. The mowing patterns may be programmed according to users' preference, such as, mowing an area with offset and parallel lines, an area with spiral and raster routes, and so on. From the points of economics, people may prefer not to overlap the routes to save battery power and therefore lower their electricity bill, and this disclosure provides an economic solution.

Figure 16B:
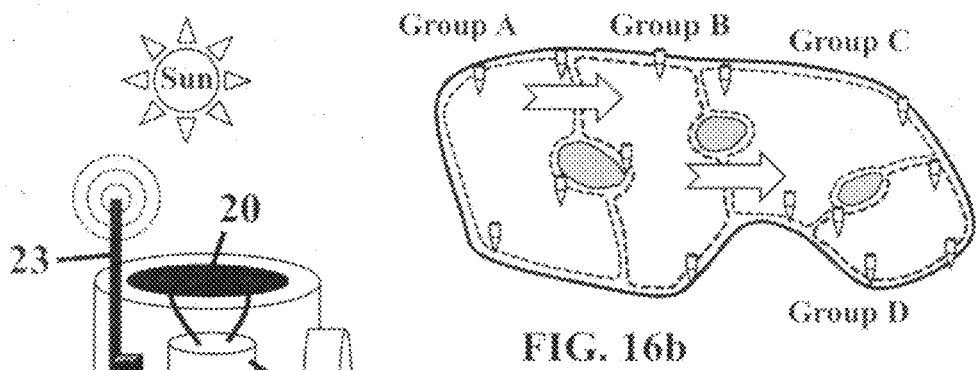
FIG. 16b illustrates that the groups of network sensors may be at sleep mode or usage mode.
Figure 16A:
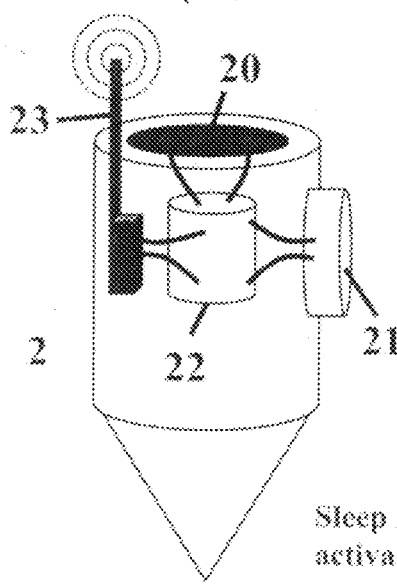
FIG. 16a illustrates the boundary stand comprising an ultrasonic receiver, a RF device, a battery, and a solar cell, and the devices on boundary stands may be at sleep mode when they are not in operation.
Figure 16C:
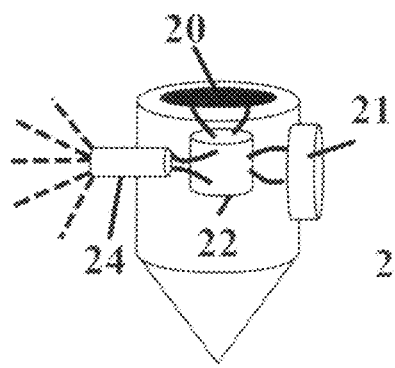
FIG. 16c illustrates an electromagnetic signal and a lighting source may be used to transfer the distance data and to calibrate and synchronize the clock times of the robotic lawn mower and boundary stands.
Figure 17:
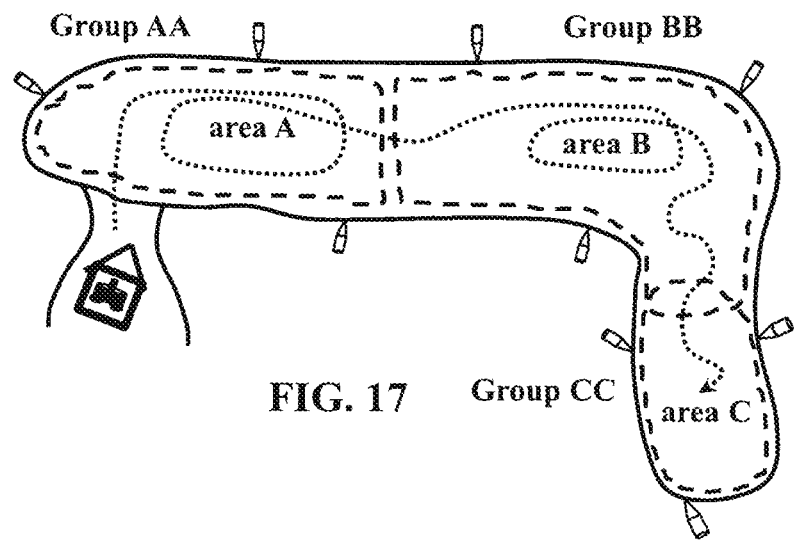
FIG. 17 illustrates that the robotic lawn mower may do the mowing with an area-by-area scheme.

FIG. 16a illustrates that a boundary stand 2 may include a RF device 23, a battery 22, and an ultrasonic receiver 21. In one embodiment, a solar cell 20 may be embedded on it to power a rechargeable battery 22 on the boundary stands 2. An electrically self-rechargeable boundary stand 2 is easy to maintain without the need of too much attention from users. The RF device and ultrasonic receivers may couple with solar lamps which are commonly used at the front or back yards of the house, at the two sides of the drive way, and at various locations. In general, the locations of network sensors may be at the similar spots as the solar lamps, and the increasing popularity of garden solar lamps makes the use of robotic lawn mower 1 with network sensors easy to be implemented because the installation of the network sensors is just as straightforward as the garden solar lamps. In one embodiment, the network sensors may be at their sleep modes while the robotic lawn mower 1 is not doing the yard work or while the devices are not activated or awaked by the robotic lawn mower 1. The sleep mode of the RF wireless device may be programmed with ZigBee technology. In one embodiment, the groups of devices on boundary stands 2 may be programmed to be at sleep mode according to application conditions. FIG. 16*b* illustrates that the boundary stands 2 may have several groups, and each group may be working independently hence while a group of stands are working, the other groups of boundary stands may be at their sleep modes to save the electricity. FIG. 16*c* illustrates that, instead of using RF device, a lighting device 24, such as infrared, may be used. The lighting device 24 is used to do the same work as RF devices, which are to transfer the distance data and to synchronize the clock times of the devices. FIG. 17 illustrates a lawn may be split into three mowing areas virtually, namely, A, B, and C, and each mowing area may have a group of boundary stands 2, which are group AA, BB, and CC here, to track the moving of robotic lawn mower 1 inside each area. One application is that a robotic lawn mower 1 starts from its docking station and enter into the area A with the guidance of the boundary stands 2 from group AA. The robotic lawn mower 1 will do the yard work inside the area A, and after the finishing of the yard work of the area A, it will enter into area B with the guidance of the boundary stands 2 from group BB, and after finishing the yard work of area B, it will enter into area C with the guidance of the boundary stands from group CC. In one embodiment, the moving of robotic lawn mower 1 may be controlled with an area-by-area scheme, and robotic lawn mower 1 may have different mowing settings at different areas, such as, mowing time, mowing patterns, mowing frequency, mowing route, and so on. In one embodiment, the groups of devices on boundary stands 2 may be at sleep mode or at usage mode depending on the position of robotic lawn mower 1, and the robotic lawn mower 1 may advise the groups of devices on boundary stands 2 to be at sleep mode to save electricity. In one embodiment, all groups of boundary stands 2 may be at sleep mode while robotic lawn mower 1 is at its docking station. Furthermore, in one embodiment, the group of boundary stands 2 may be awaked only when they are being advised by the mower.

Figure 18:
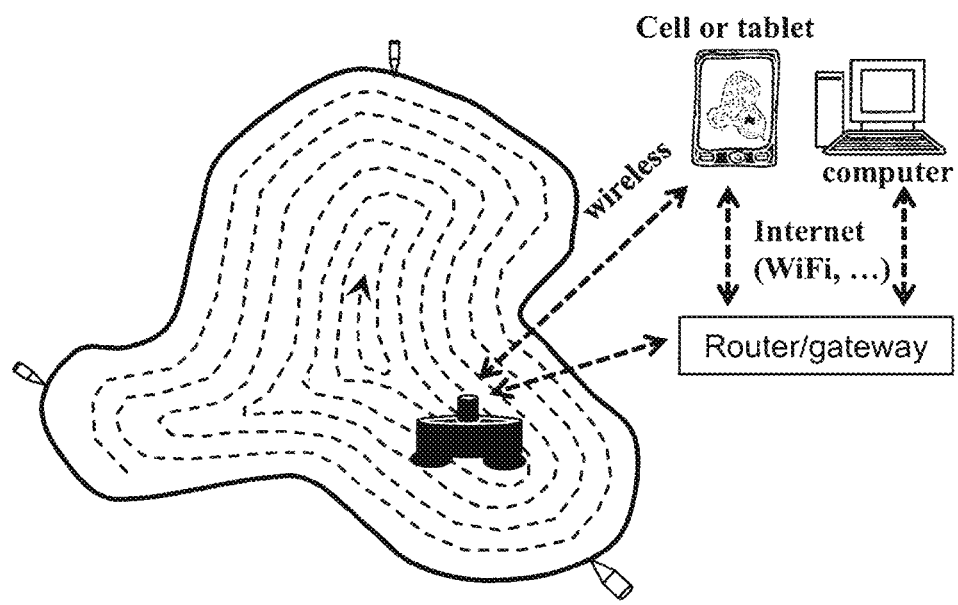
FIG. 18 illustrates that the mowing of the robotic lawn mower may be controlled and monitored with a computer, a cell phone, a table, at either local or remote sites.

FIG. 18 illustrates that the mowing route could be controlled and monitored by a computer, a cell phone, and a tablet. The controlling and monitoring may be through a local or a remote network. The communication may be through an internet, a WiFi, and a wireless mobile device. The relative positions in between robotic lawn mower and boundary stands, as previous explained, can be obtained through innovative means of this disclosure. Thus a map of relative positions of robotic lawn mower and boundary stands at any time during the mowing operation may be depicted with a program and the map may be sent to users through wireless devices. With the innovation, users may monitor and control the mowing route at either a local site or a remote site.

If a modern GPS device is installed on the robotic lawn mower 1, the position of the mower can be monitored as well. However, there are some fundamental differences between using GPS and current disclosure, as showing below:
- (a) The accuracy of the modern GPS is usually around a few meters and it is not good enough for the application of lawn mowing. The accuracy of current disclosure can be within one inch easily. The accurate identification of the position of the robotic mower 1 is one of the cores of this disclosure.
- (b) In order to do the lawn work, the identification of the relative distances in between robotic lawn mower 1 and boundary stands 2 is needed. These relative distances allow the mowing system to define a map for lawn mowing. Current disclosure is able to identify these relative distances and to define a map for the lawn mowing, while a plurality of GPS devices may be placed at the lawn border to define a map, they will encounter the issues of accuracy and cost.
- (c) The GPS communication is through satellite. If modern GPS devices are installed on the robotic lawn mower 1 and boundary stands 2, then the communication, data transmission, and data analysis will become much more complicated because all of these devices have to go through satellite. Instead, current disclosure is using RF and ultrasonic devices for the robotic lawn mower 1 and boundary stands 2 to communicate with each other, and this may be called a local GPS system or a mower GPS system. Current mower GPS system comprises innovative means to determine the positions of robotic lawn mower 1 and boundary stands 2, and it is much quicker, easier, cheaper, and more straightforward.

What is claimed is:

1. A mowing system for mowing a lawn, comprising:
a robotic lawn mower and a plurality of boundary stands, wherein said boundary stands are configured to be placed near a boundary of the lawn, wherein said boundary stands enclose the lawn, the connection of said boundary stands outlines the lawn boundary and depicts the lawn shape, said boundary stands are placed at the lawn boundary the to identify the lawn boundary but the coordinates or exact positions of said boundary stands are not given and are not known;

an ultrasonic device and an RF device configured to be placed on each of said boundary stands and said robotic lawn mower, wherein said ultrasonic devices are configured transmit and receive ultrasonic waves, said RF devices are configured to transmit and receive data of traveling times and traveling distances of the ultrasonic waves, and to calibrate and synchronize clock times of said robotic lawn mower and said boundary stands;

wherein said ultrasonic devices on said robotic lawn mower function as ultrasonic transmitters to transmit out the ultrasonic waves toward said boundary stands, said ultrasonic devices on said boundary stands to function as ultrasonic receivers to receive the ultrasonic waves from said robotic lawn mower, wherein, said boundary stands calculate distances in between said robotic lawn mower and said boundary stands based on time-of-flight of the ultrasonic waves upon the receiving of the ultrasonic waves from said robotic lawn mower, then transmit the data of distances back to said robotic lawn mower, such that a group of relative distances in between said robotic lawn mower and said boundary stands are determined, wherein the group of relative distances do not contain the coordinates or exact positions of said boundary stands;

wherein said robotic lawn mower obtains a first group of relative distances in between said robotic lawn mower and said boundary stands at a first location, and said robotic lawn mower moves a predetermined length in a predetermined direction to a second location to obtain a second group of the relative distances in between said robotic lawn mower and said boundary stands, the determinations of said first and second groups of relative distances and said mowing length from said first location to said second location continue as said robotic lawn mower travels to one or more new locations on the lawn, such that the relative positions in between said robotic lawn mower and said boundary stands are determined by determining directions and distances of the boundary stands with respect to the robotic mower based on the first and second groups of relative distances, and said robotic lawn mower determines the relative distances and angles with respect to said boundary stands during a mowing operation;

wherein said robotic lawn mower, while traveling on the lawn doing the mowing operation, with the determinations of said relative distances and angles in between said robotic lawn mower and said boundary stands, knows its position on the lawn, such that said robotic lawn mower defines a mowing route, thereby said robotic lawn mower mows the lawn to save mower's battery energy.

2. The mowing system of claim 1, wherein said robotic lawn mower comprises:
a plurality of ultrasonic transmitters to transmit the ultrasonic waves toward to said boundary stands, wherein said boundary stands are able to calculate the relative distances in between said robotic lawn mower and said boundary stands, based on the traveling times of the ultrasonic waves; and
an RF device to transmit RF signals to calibrate and synchronize the clock times of said boundary stands, and to receive the RF signals and data of the relative distances from said boundary stands;
wherein said ultrasonic transmitters and said RF device on said robotic lawn mower are coupled with said ultrasonic receivers and said RF devices on said boundary stands to determine the relative positions of said robotic lawn mower and said boundary stands.

3. The mowing system of claim 1, wherein said ultrasonic transmitters on said robotic lawn mower comprise transmitters to transmit the ultrasonic waves in various directions, angles, and frequencies to said boundary stands, wherein each said boundary stand, upon receiving of the ultrasonic wave, calculates the relative distance in between said boundary stand and said robotic lawn mower,
wherein said ultrasonic transmitters on said robotic lawn mower are arranged to broadcast the ultrasonic waves to cover 360 degrees, such that when said robotic lawn mower enters into a mowing area, said boundary stands at the lawn boundary are able to detect the ultrasonic waves and transmit the data of distances to said robotic lawn mower.

4. The mowing system of claim 1, wherein each boundary stand comprises an ultrasonic receiver and an RF device, said ultrasonic receiver receives the ultrasonic waves from said robotic lawn mower,
said RF device receives RF signals from said robotic lawn mower for calibration and synchronization of the clock times, and to transmit the data of the relative distances to said robotic lawn mower, said ultrasonic receivers and RF devices on said boundary stands couple with said ultrasonic transmitters and said RF devices on said robotic lawn mower to form a network of sensors for identifications of relative positions of said robotic lawn mower and said boundary stands.

5. The mowing system of claim 1, wherein
said RF device on said robotic lawn mower firstly transmits an RF signal to synchronize and to calibrate the clock times of said boundary stands then said ultrasonic transmitters on said robotic lawn mower sends out an ultrasonic signal to said boundary stands, wherein each boundary stand upon receiving of the ultrasonic signal from said robotic lawn mower calculates the relative positions in between said boundary stand and said robotic lawn mower then transmits the data of the relative positions to said robotic lawn mower through said RF device on said boundary stand; or
said ultrasonic devices on said robotic lawn mower firstly transmit an ultrasonic wave to said boundary stands, then said RF device on said robotic lawn mower sends out an RF signal to synchronize and calibrate the clock times of said boundary stands, wherein each boundary stand upon receiving of ultrasonic signal from said robotic lawn mower calculate the relative positions in between said boundary stand and said robotic lawn mower, and then transmits the data of the relative positions to said robotic lawn mower through said RF device on said boundary stand;
such that said robotic lawn mower determines the relative positions in between said robotic lawn mower and said boundary stands during its mowing operation inside the lawn.

6. The mowing system of claim 1, wherein each boundary stand comprises a solar cell and a battery to provide electric power to said RF device and said ultrasonic device, said solar cell is to recharge battery power through solar lights,
said ultrasonic device and said RF devices on said boundary stands are in sleep mode to save electric power while said robotic lawn mower is not doing mowing work, while said robotic lawn mower is not inside a specific area, or when said robotic lawn mower and said boundary stands are not coupled with each other for work of a mowing area,
said ultrasonic device and said RF devices on said boundary stands are commanded by said robotic lawn mower to be in sleep or awaked mode with a networking communication, such that said robotic lawn mower mows the lawn with an area-by-area scheme depending on the location of said robotic lawn mower, determines said robotic lawn mower's position with respect to said boundary stands, and defines the mowing route.

7. The mowing system of claim 1, wherein said boundary stands comprise fixed boundary stands or floating boundary stands to be placed near the boundary of the lawn,
wherein said floating boundary stands define positions of a portion of lawn border and are reusable and can be relocated to different locations of the lawn to define different positions of the lawn border,
wherein said fixed boundary stands are used to stay at fixed locations and not to be removed or relocated to other positions,
wherein floating and fixed boundary stands are used to determine the boundary and areas of the lawn, to determine relative positions of said robotic lawn mower and said boundary stands, to identify an object inside the lawn, and to define a mowing route across mowing areas.

8. The mowing system of claim 1, comprising a microcontroller to control and monitor a position of said robotic lawn mower inside the lawn through a wireless communication selected from the group including internet, WIFI, RF, and Bluetooth, and with a gadget selected from the group including a desktop computer, a cell phone, a tablet, a notebook computer, and a handheld mobile device,
wherein the mowing system is able to identify the relative positions of said robotic lawn mower with respect to said boundary stands during mowing operation, such that a lawn map and a mowing route are sent to users through wireless devices.

9. The mowing system of claim 1, wherein said boundary stands comprise a plurality of microcontrollers to define their addresses and IDs with a method consisting of hardware and software approaches, such that when said boundary stands transfer RF signals toward said robotic lawn mower, said robotic lawn mower identifies and differentiates RF signals originating from which of said boundary stands, and said robotic lawn mower associates the relative distances in between said robotic lawn mower and said boundary stands with the addresses and IDs of said boundary stands, such that said robotic lawn mower determines a relative position of said robotic lawn mower with respect to said boundary stands, and controls and monitors the mowing route.

10. The mowing system of claim 1, further comprising a lighting device on said robotic lawn mower, and on each boundary stands to couple with said ultrasonic devices, wherein,
said lighting device on said robotic lawn mower sends a light signal toward said boundary stands to calibrate and synchronize the time clocks of said boundary stands,
said lighting device on said robotic lawn mower also receives the data of distances from said boundary stands to said robotic lawn mower,
said lighting devices on said boundary stands transmit the data of distances from said boundary stands to said robotic lawn mower,
said lighting devices on said boundary stands also receive the light signal from said robotic lawn mower for calibration and synchronization of time clocks,
said lighting devices couple with said ultrasonic devices to track and control the relative positions of said robotic lawn mower and said boundary stands.

11. A method for determining a boundary of a lawn, comprising:
broadcasting, from an ultrasonic transmitter of a robotic lawn mower at a first location, a first ultrasonic wave signal;
receiving the first ultrasonic wave signal, by ultrasonic receivers of a plurality of boundary devices that are configured to be placed near the boundary of the lawn, wherein the boundary devices enclose the lawn, the connection of the boundary devices outlines the lawn boundary and depicts the lawn shape, the boundary devices are placed at the lawn boundary to identify the lawn boundary but the coordinates or exact positions of the boundary devices are not given and are not known;
for each individual boundary device, determining, by a processor of the individual boundary device, a first distance between the robotic lawn mower and the individual boundary device based on the received first ultrasonic wave signal;
receiving, at an RF component of the robotic lawn mower, RF signals from each of the individual boundary devices;
calculating, based on the received RF signals, the first distances between the robotic lawn mower and the boundary devices;
moving the robotic lawn mower to a second location;
broadcasting, from the ultrasonic transmitter of a robotic lawn mower at the second location, a second ultrasonic wave signal;
receiving the second ultrasonic wave signal, by ultrasonic receivers of the boundary devices;
for each individual boundary device, determining, by the processor of the individual boundary device, a second distance between the robotic lawn mower and the individual boundary device based on the received second ultrasonic wave signal;
receiving, at the RF component of the robotic lawn mower, RF signals from each individual boundary device;
calculating, based on the received RF signals, the second distances between the robotic lawn mower and the boundary devices, wherein the first distances and second distances do not contain coordinates or exact positions of the boundary devices; and
determining, by a processor of the robotic lawn mower, locations of the boundary devices based on the received first and second distances for the robotic lawn mower moving to the first and second locations, wherein the locations of the boundary devices are determined by determining directions and distances of the boundary devices with respect to the robotic lawn mower based on the first and second distances.

12. The method of claim 11, further comprising:
transmitting, from the RF component of the robotic lawn mower, a calibration RF signal for clock time calibration;
receiving, by RF receivers of the boundary devices, the calibration RF signal; and
calibrating clock times of processors of the boundary devices based on the calibration RF signal for clock time calibration, such that the clock times of the processors of the boundary devices are the same as a clock time of a processor of the robotic lawn mower.

* * * * *